Nov. 28, 1950  C. F. VOYTECH  2,531,996
VARIABLE-SPEED TRANSMISSION
Filed July 23, 1945  2 Sheets-Sheet 1
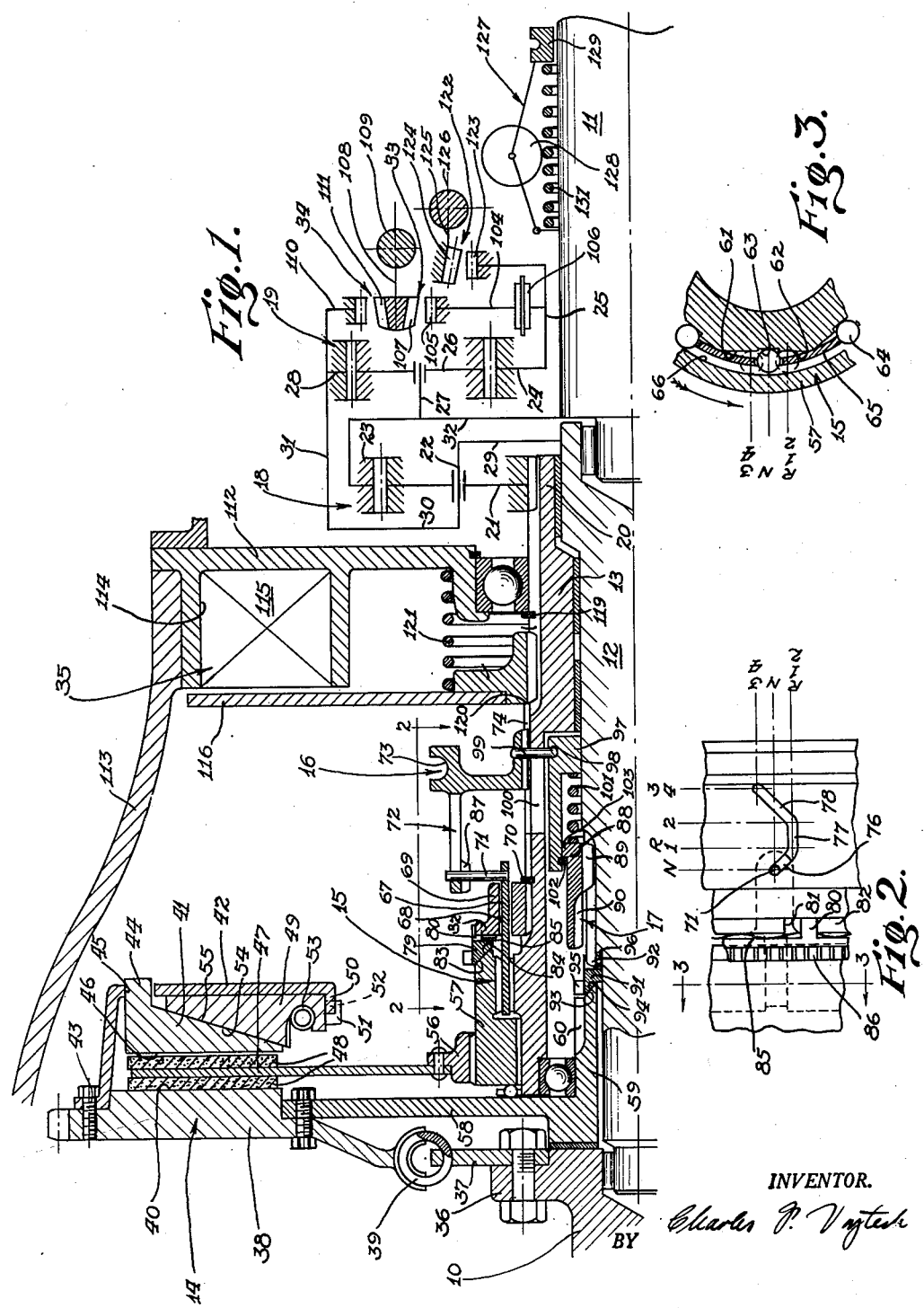
INVENTOR.
Charles F. Voytech
BY Patented Nov. 28, 1950

2,531,996

UNITED STATES PATENT OFFICE 2,531,996

VARIABLE-SPEED TRANSMISSION

Charles F. Voytech, Chicago, Ill.

Application July 23, 1945, Serial No. 606,529

18 Claims. (Cl. 74—752)

This invention relates to power transmitting devices and particularly to devices of this character which are adapted to provide a plurality of speed and torque ratios. More particularly this invention relates an an automatically variable transmission which utilizes constant mesh gearing of the planetary type with means available for effecting changes in ratio without requiring a reduction in torque during the change in ratio.

This invention is in the nature of an improvement in the transmission described in my copending application, Serial No. 506,124, filed October 14, 1943 now Patent No. 2,418,378. In the said prior application there is described a four-speed transmission of the planetary type which utilizes two simple planetary gear sets interconnected to provide two input elements, an output element, two releasable reaction elements for forward speeds and one releasable reaction element for reverse drive. An automatic friction clutch and a fluid coupling are used to connect the input elements to the source of power. Because of the drag torque which is produced by a fluid coupling when the source of power is rotating at slow speeds, e. g. when the source of power is an internal combustion engine and the engine is idling, and also to provide a positive neutral, a second clutch is used in series with the fluid coupling, the clutch necessarily being of the friction type so as to be engageable while transmitting torque.

In order to relieve the operator of the physical effort required to operate the clutches, hydraulic power means are used in the aforesaid prior transmission to actuate the series clutch and centrifugal force is used to operate the clutch for connecting the other input clutch to the source of power. These various clutches are expensive to make and maintain in working order. The fluid coupling is likewise expensive to make and besides is not very efficient, particularly under heavy loads.

The principal object of this invention is to simplify the means by which the input elements of the aforesaid planetary gearing are connected to the source of power and thus to make the transmission cheaper to manufacture and easier to maintain in good working order.

A more specific object of this invention is to eliminate the fluid coupling and the friction clutch in series with the coupling, and yet to retain the functions of both.

Another object of this invention is to provide ratio changing means of the type requiring a relief of torque before a change in the condition of the means can be effected, wherein the relief of torque is effected in the means without reducing the power of the prime mover connected to the input elements. Expressed a little differently, this invention seeks to provide a means for operating a jaw clutch or the like in such a manner that the position of the power control element for the prime mover need not be changed while the jaw clutch is being shifted, thus simulating a power shift. When used in an automobile, the ratio changing means will operate without the necessity of the operator removing his foot from the accelerator pedal despite the fact that the means inherently requires a relief in torque before it can operate.

Still another object of this invention is to provide ratio changing means for the power transmission of an internal combustion engine which is controllable by the power control element of the engine under ordinary conditions, but which will overrule the power control element when the speed of the output shaft exceeds the optimum speed for any given ratio. Thus when installed in an automobile the driver can control the shift from one ratio to another by means of the accelerator pedal and can stay in one ratio beyond the point where the governor associated with the ratio changing means would tend to effect a shift. For example, when the driver finds himself on an upgrade behind a slow-moving vehicle and the control means would normally shift to the next higher ratio because of the lighter throttle which ratio, however, is not capable of accelerating the vehicle to pass the slow-moving vehicle, the driver can stay in the more desirable lower ratio. If, on the other hand, the driver should forget to shift to the next higher ratio after passing the slow-moving vehicle and the speed of his own vehicle should increase beyond the maximum permissible for that ratio, then the shift will be effected automatically without any conscious effort on the part of the driver.

Another object of this invention is to provide a four-speed transmission for an automotive vehicle wherein the first speed is made effective by means of an automatic friction clutch, the fourth speed is made effective by the operation of an automatic friction brake and the two intermediate speeds are rendered effective by the operation of devices which require a change in the relative direction of drive of the input and output elements of the said devices, with control means for effecting this change in the direction of drive automatically if the driver should fail to produce the change by reducing the speed of the vehicle engine.

Another object of this invention is to provide a four-speed transmission for an automotive vehicle in which the fourth speed is power shifted, with means for momentarily shifting into this fourth speed to assist in effecting a shift into one or the other of the intermediate speeds.

A specific object of this transmission is to provide a simple control for toothed reaction elements such that shifts can be made between forward and reverse speeds quickly, the control being rugged and fool-proof to avoid a simultaneous shift into two ratios.

These and other objects and features of this invention will become apparent from the following description when taken together with the accompanying drawings in which Fig. 1 is a schematic section taken along the axis of a preferred embodiment of this invention;

Fig. 2 is a fragmentary plan view of a portion of the preferred embodiment taken along line 2—2 of Fig. 1;

Fig. 3 is a section taken along line 3—3 of Fig. 2; and

Figure 4:
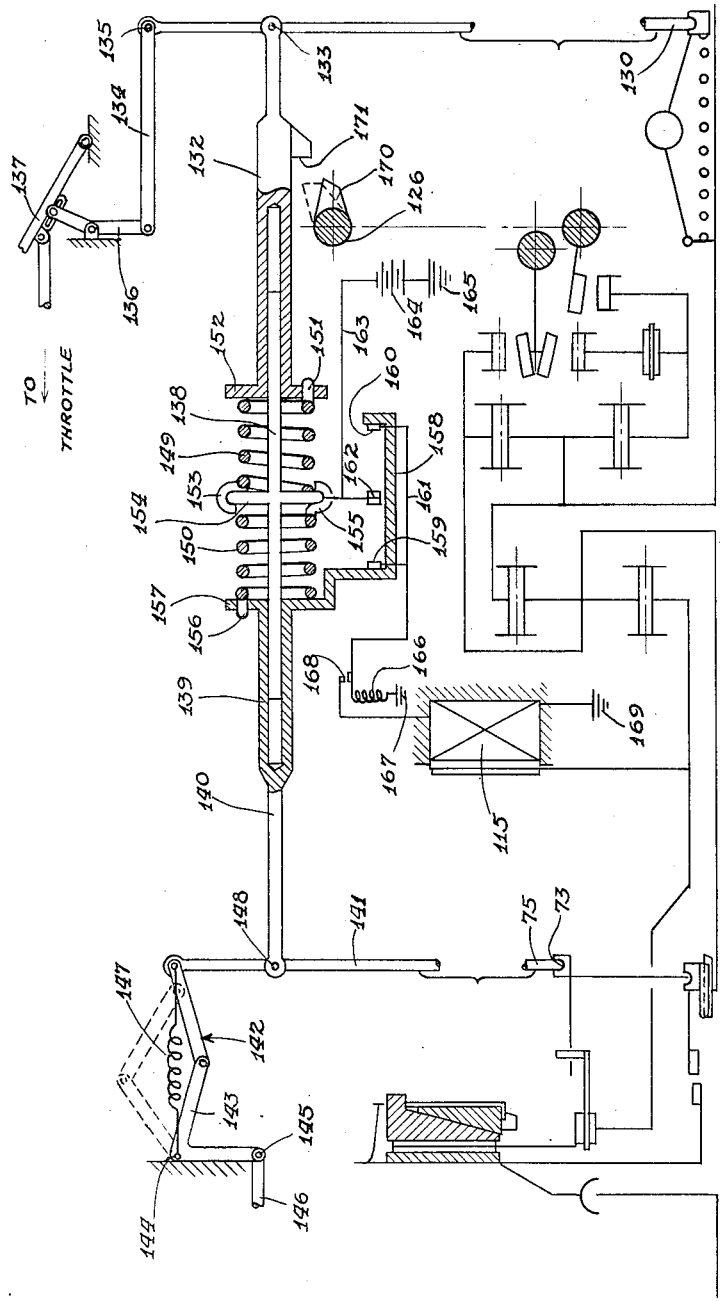
Fig. 4 is a schematic diagram of the controls for the embodiment of Fig. 1.

Referring now to the drawings for a detailed description of the invention and particularly to Fig. 1, the preferred embodiment is shown in the form of a transmission for an automobile, the transmission having an input structure which may be a shaft 10, and output structure which may likewise be a shaft 11 and an intermediate shaft 12. A hollow shaft 13 surrounds the intermediate shaft 12 and is adapted to be connected at its input end to the drive shaft 10 by means of a friction clutch 14, the effectiveness of the connection, however, being controlled by a freewheel clutch 15. Said freewheel clutch 15 is in turn controlled by a shift collar 16 so as to provide a neutral position and a drive in either direction. The mechanism by which clutch 15 is controlled will be described in detail hereinafter. Intermediate shaft 12 is connected to drive shaft 10 by means including a positive or jaw clutch 17 one element of which rotates with the drive shaft.

The drive is transmitted from intermediate shaft 12 and hollow shaft 13 to output shaft 11 by two sets of planetary gearing 18 and 19. Planetary gearing 18 is comprised of a sun gear 20, which may be formed on the end of shaft 13, a plurality of planet pinions 21 mounted on a carrier 22 and a ring gear 23, planet pinions 21 meshing with ring gear 23 and sun gear 20. Planetary gearing 19 is comprised of a sun gear 24 mounted for rotation with a sleeve 25 loose on driven or output shaft 11, a plurality of planet pinions 26 mounted on a carrier 27 and a ring gear 28, planet pinions 26 meshing with ring gear 28 and sun gear 24. Carrier 22 is driven directly from intermediate shaft 12 by a connection 29 which may be a disc or spider and is directly connected to ring gear 28 by a connection 30 and a drum 31. Ring gear 23 and carrier 27 are connected by a spider 32 which in turn is connected directly to output shaft 11 so that ring gear 23, carrier 27 and output shaft 11 rotate in unison.

The reaction elements by which the different torque and speed ratios are obtained comprise a brake 33 for low and second speeds, a brake 34 for reverse drive, and a brake 35 for fourth speed. Brakes 33 and 34 are of the positive toothed type and brake 35 is of the friction type so that brakes 33 and 34 can be operated only when there is no torque being transmitted through the gearing and brake 35 can be rendered operative or released even though power is being transmitted through the gearing.

The details of the various elements mentioned above will now be described. Shaft 10 is formed with a flange 36 to which is secured a disc 37 forming part of a flywheel 38. Said flywheel 38 has incorporated therein a plurality of springs 39 through which the drive is transmitted and which perform the function of absorbing torsional vibrations which may be generated by the internal combustion engine (not shown) supplying the power to be transformed and transmitted.

Flywheel 38 forms part of clutch 14, the flywheel being provided with a friction face 40 and a spaced pressure plate 41 supported from the flywheel by a stamped cover plate 42 secured to the flywheel by bolts 43. Said pressure plate 41 is centered relative to the flywheel and driven from it by a plurality of lugs 44 extending into slots 45 punched in cover plate 42. A friction surface 46 is machined on the radial face of pressure plate 41, said surface 46 being spaced from surface 40 so that a driven clutch disc 47 may be interposed therebetween. Said disc 47 may be provided with suitable annular friction facings 48 which cooperate with the friction surfaces on the flywheel and pressure plate to transmit the drive from the flywheel to driven disc 47. Clutch 14 is energized by a plurality of wedge-shaped weights 49 supported by an inturned flange 50 on cover plate 42 and driven from the cover plate by lugs 51 operating in slots 52 in flange 50. A garter spring 53 normally holds the weights in a retracted position. The outward movement of the weights 49 is translated into an axial movement of the pressure plate 41 by a pair of cooperating angularly disposed surfaces 54 and 55 formed in the wedges and pressure plate respectively. Thus when the flywheel is rotated at a sufficiently high speed to overcome the force of spring 53, which may be selected to coincide with a speed just above the idling speed of the engine, the weights 49 will move outward and through the intermediary of surfaces 54 and 55 will cause pressure plate 41 to move axially to compress disc 47 against flywheel 38 to engage clutch 14.

Disc 47 of clutch 14 is secured to a hub member 56 which in turn is splined to a drum 57 constituting the driving member of freewheel clutch 15. Rigidly secured to the flywheel 38 is a disc 58 which is provided with an axially extending flange 59 on the end of which are formed teeth 60. Said teeth 60 constitute the driving member of clutch 17. It will be noted that disc 58 is connected in series with vibration absorbing springs 39 so that said springs will be effective to prevent the transmission of vibrations to clutch 17 as well as to clutches 14 and 15.

Referring now to Fig. 3, clutch 15 is comprised of cams 61 and 62 machined near the end of hollow shaft 13 and arranged symmetrically about a plurality of grooves or depressions 63 equally spaced about the periphery of shaft 13. A roller 64 is disposed in each groove and maintained in proper relation therewith by a cage 65. Rollers 64 are of such diameter that when they are positioned in a groove they are out of contact with the inner cylindrical surface 66 of drum 57 and the latter is ineffectual to transmit a drive to hollow shaft 13. When cage 65 is rotated clockwise as viewed in Fig. 3 so that the rollers are in contact with cams 61 and the inner surface 66, no drive will be transmitted between drum 57 and shaft 13 unless shaft 13 tends to rotate in the direction of the arrow at a higher speed than drum 57. When cage 65 is rotated counterclockwise as viewed in Fig. 3 so that the rollers are in contact with cams 62 and the inner surface 66, no drive will be transmitted between drum 57 and shaft 13 unless shaft 13 tends to rotate in the direction of the arrow at a slower speed than drum 57.

The control for cage 65 is comprised of two or more arms 67 (Fig. 1) extending through arcuate slots 68 in a ring 69 splined to shaft 13 and fixed against axial movement thereon by a snap ring 70. Fixed to the ends of arms 67 are radially extending pins 71 the outer ends of which pass through cam slots 72 in shift collar 16. Said shift collar 16 is rotatable with and axially slidable on hollow shaft 13 by means of splines 74 and may be controlled from the exterior of the transmission by a yoke 75 (Fig. 4) riding in a groove 73. Slot 72 is comprised of a relatively short angularly disposed section 76 (Fig. 2), an axial section 77 and a relatively long angularly disposed section 78, the slope of the last-mentioned section being opposite to that of the short section 76. Thus when pin 71 is at the end of section 76 as shown in Fig. 2, cage 65 will position rollers 64 in the grooves 63 so that no drive will be transmitted in either direction of rotation of drum 57 relative to shaft 13. This constitutes the neutral position of clutch 15. Shifting collar 16 to the left as viewed in Fig. 1 until pin 71 is in section 77 will cause cage 65 to move rollers 64 into contact with cams 62, thereby establishing a drive between drum 57 and shaft 13 when the said drum tends to rotate faster than shaft 13, and continued shift of the collar 16 to the left until pin 71 reaches the end of section 78 will cause cage 65 to move rollers 64 into contact with cams 61, thereby establishing a drive between the said drum and shaft when the said drum tends to rotate slower than shaft 13. It is understood that the shape of the slot sections as well as their length may be modified to produce any desired sequence or rate of movement of pin 71.

To avoid an abrupt shift of the rollers 64 into contact with cam surfaces 61 a blocking mechanism is used. This mechanism is comprised of a ring 79 interposed between ring 69 and drum 57, said ring 79 having a lug 80 extending into a slot 81 in a flange 82 on ring 69 to form a lost-motion connection between rings 69 and 79. Said ring 79 has a conical surface 83 cooperating with a conical surface 84 on the end of drum 57 to provide a friction drive therebetween. A spring 85 is interposed between flange 82 and ring 79 to cause the friction surfaces 83 and 84 to contact one another continuously with a light pressure and thereby compel ring 79 to be biased in the direction in which drum 57 is moving relative to ring 69. Thus when drum 57 tends to rotate ahead of ring 69 lug 80 will be at the lower end (Fig. 2) of slot 81 and when drum 57 tends to lag behind ring 69 lug 80 will be at the upper end of the slot.

Ring 79 is provided with radially extending teeth 86 which extend into the path of movement of similar teeth 87 formed in the end region of shift collar 16. If collar 16 is moved to the left (Fig. 1) while lug 80 is in the position shown in Fig. 2 teeth 86 will not be aligned with teeth 87 and further movement of collar 16 in this direction will be blocked until drum 57 tends to rotate at a slower speed than ring 69. The point at which the movement of shift collar 16 is blocked occurs when pin 71 is in the middle of section 78 of slot 72 which coincides with the neutral position of rollers 64, i. e., when rollers 64 are in the grooves 63. When lug 80 is moved to the opposite end of the slots 81 teeth 86 are aligned with teeth 87 and shift collar 16 can move unhindered until pin 71 reaches the right-hand end (Fig. 2) of section 78. This effects a shift of rollers 64 into contact with cams 61.

Clutch 17 is comprised of a shift collar 88 having a sliding splined connection 89 with intermediate shaft 12 and internal clutch teeth 90 at the left-hand end (Fig. 1) thereof which are adapted to mesh with teeth 60 on flange 59 to form a driving connection between said flange and the intermediate shaft 12. To avoid tooth clash resulting from an attempted shift when the flange and shaft are rotating asynchronously a blocking ring 91 similar to blocking ring 79 is interposed between teeth 90 and 60. Said ring 91 has a lost-motion connection 92 with shaft 12, a conical surface 93 cooperating with a conical surface 94 on flange 59, and teeth 95 located in the path of movement of teeth 90. A spring 96 constantly biases ring 91 toward flange 59 to engage the friction surfaces 93 and 94, thereby causing the position of the blocking ring 91 to be controlled by the relative speed of rotation between the flange and intermediate shaft. The lost-motion connection 92 is such that movement of shift collar 88 into clutching position is blocked until the relative direction of rotation between the two elements of the clutch changes, i. e. until the two elements are rotating at substantially the same speed and blocking ring 91 has been rolled out of the way, thereby avoiding tooth clash.

Shift collar 88 is controlled from shift collar 16 by a sleeve 97 slidable axially on intermediate shaft 12 and having a groove 98 in which rides one or more pins 99 secured to shift collar 16. To allow for the axial movement of shift collar 16, relative to hollow shaft 13, pin 99 operates in a slot 100 in said hollow shaft. The connection between sleeve 97 and shift collar 88 is a spring 101 which is compressed between the sleeve and collar to transmit the engaging movement of sleeve 97 and a snap ring 102 which transmits the return or disengaging movement. The disengaging movement is effected when snap ring 102 strikes a shoulder 103 formed on the end of collar 88 during movement of sleeve 97 to the left a sufficient distance to take up the lost motion between the collar and sleeve. Thus a lost-motion connection is provided in the engaging direction which permits the shift collar 16 to move to the limit of its shift while shift collar 88 is waiting to be synchronized with flange 59, the spring 101 meanwhile storing the shifting energy and releasing it when engaging movement of shift collar 88 can be resumed. For the disengaging function a positive connection is used which insures disengagement when and as expected.

Turning now to the various brakes 33, 34 and 35 mentioned briefly above, brake 33 is comprised of a wheel 104 having teeth 105 on the periphery thereof and connected by means of a one-way clutch 106 to sleeve 25 which, as previously stated, rotates with gear 24. Said one-way clutch 106 is so constructed as to permit gear 24 to rotate freely when said gear tends to rotate in the same direction as drive shaft 10, but constrains said gear to rotate with wheel 104 when it tends to rotate in the opposite direction. Wheel 104 is held against rotation by a sprag 107 in the form of a gear sector mounted on an arm 108 secured to a transverse rockshaft 109. When the rockshaft 109 is turned counterclockwise as viewed in Fig. 1 sprag 107 is caused to engage teeth 105 of wheel 104 as soon as, or while said wheel is stationary. It is contemplated that rockshaft 109 will be manually controlled by suitable means (not shown) on the exterior of the transmission.

Brake 34 is comprised of an internally toothed wheel 110 which rotates with drum 31 and a sprag 111 also mounted on arm 108 so that when said arm is turned clockwise as viewed in Fig. 1 sprag 111 will engage toothed wheel 110 and hold the wheel against rotation. It will be noted that brakes 33 and 34 are mutually exclusive-operable, i. e., whenever brake 33 is engaged brake 34 is necessarily disengaged and similarly whenever brake 34 is engaged brake 33 is necessarily disengaged. This mutually exclusive operation is essential for the proper operation of the transmission as will become apparent from the subsequent description. It will also be noted that the thrust of toothed wheels 105 and 110 will be taken axially of rock shaft 109.

Brake 35 is fundamentally different from brakes 33 and 34 in that it is a friction brake whereas brakes 33 and 34 are of the positive, non-slipping type. This means that brake 35 can be applied whether or not the rotating member is stationary and irrespective of the tendency of the rotating member to continue to rotate due to the continued application of power to it. Said brake 35 is comprised of a stationary housing 112 which is secured to the transmission housing 113 and is formed with an annular recess 114 in which is located an electromagnet 115. The armature of the electromagnet is a disc 116 secured at its inner region to a hub 117 which, in turn, is slidably splined to teeth 118 on hollow shaft 13. Said teeth 118 may be extensions of the teeth of gear 20. Movement of hub 117 on teeth 118 is limited on one side by a snap ring 119 and on the other side by a shoulder 120 formed by the ends of splines 74. A spring 121 continuously urges disc 116 away from electromagnet 115 to avoid creating unnecessary friction losses, but disc 116 is nevertheless held sufficiently close to the electromagnet to be attracted thereby when the latter is energized. It will be apparent that brake 35 is utilized to arrest the rotation of sun gear 20 or, as will be explained later, to reduce the speed of the sun gear and its associated hollow shaft 13 to facilitate shifting clutches 15 and 17.

Another brake is provided for sun gear 24 for the purpose of by-passing one-way clutch 106. This brake is shown at 122 and comprises a toothed wheel 123 mounted for rotation with sleeve 25 and a sprag 124 formed in the end of an arm 125. Said arm 125 is rotatable with a transversely disposed rockshaft 126 the movement of which is controlled manually so that a counterclockwise rotation of the rockshaft causes sprag 124 to engage toothed wheel 123 to arrest the rotation of the sun gear 24 irrespective of the direction of rotation the said sun gear tends to assume. Brake 122 is an emergency brake and is used when it is desired to use the compression of the engine in a lower ratio to hold back the vehicle on a downgrade.

The various ratios available in the transmission so far described are low, second, direct, overdrive and reverse. A neutral is, of course, likewise available. To condition the transmission for neutral shift collar 16 is moved to its extreme right-hand (Fig. 1) position. To condition the transmission for low speed operation brake 33 is rendered effective and hollow shaft 13 is driven through clutches 14 and 15. For second speed brake 33 remains on, clutch 17 is rendered effective and clutch 15 free-wheels as well as one-way clutch 106. If, however, it is desired to circumvent the free wheeling action of clutch 106 as for example when coasting downhill, brake 122 may be applied and the vehicle will coast in second speed. The direction of the reaction torque on sun gear 24 in second speed is still opposite to the direction of rotation of drive shaft 10 so that normally, with power on, brake 122 will be effective to hold said sun gear stationary. For direct drive, clutch 15 is rendered effective to constrain sun gear 20 to rotate at the same speed as drive shaft 10, clutch 17 remains engaged as well as brake 33 and one-way clutch 106 freewheels due to the change in the direction of the torque reaction on sun gear 24 which results from the operation of the planetary gear sets as locked-up units. Overdrive is obtained from direct drive merely by energizing brake 35. Reverse drive is obtained by engaging brake 34 and releasing all other brakes, clutches 14 and 15 being engaged as for low speed. The power paths through the gearing for each of the ratios are as follows: For first speed, from drive shaft 10 through friction clutch 14, one-way clutch 15, hollow shaft 13, gears 20, 21, 23 and spider 32 to driven shaft 11, with carrier 22, drum 31, and gears 28 and 26 reacting against sun gear 24 and transmitting the reaction to spider 32 through carrier 27 and providing a movable reaction for carrier 22. For second speed, from drive shaft 10 through flywheel 38, disc 58, clutch 17, intermediate shaft 12, connection 29, carrier 22, drum 31, gears 28 and 26, carrier 27 and spider 32 to driven shaft 11, with gear 20 of planetary gearset 18 overrunning shaft 12 and gear 24 supplying the reaction for planetary gearset 19. For direct drive both gear sets rotate as units by reason of the fact that sun gear 20, and hollow shaft 13 are prevented from rotating ahead of intermediate shaft 12 and carrier 22 by one-way clutch 15 and hence drive shaft 10 and driven shaft 11 rotate at the same speed. For overdrive, from drive shaft 10, flywheel 38, disc 58, clutch 17, intermediate shaft 12, connection 29, carrier 22, gears 21 and 23 and spider 32 to driven shaft 11, gear 20 supplying the reaction for planet gears 21.

The description thus far has been concerned with the power transmitting elements and with the reaction elements and details of the clutches. The controls for these reaction elements and certain of the clutches will now be described.

It is contemplated that the transmission will be controlled automatically as a function of both speed and torque, the latter being represented by the position of the accelerator or power control lever. To this end a governor 127 is provided, said governor in the form chosen for illustration being of the fly-ball type and comprised of a plurality of balls 128 driven by output shaft 11 so as to position themselves as a function of the speed of the vehicle. The outward movement of the balls is translated into an axial movement of a collar 129 in which rides a lever or yoke 130 (Fig. 4). A spring 131 counteracts the centrifugal force developed in the balls and regulates the speed at which the balls will assume given positions, i. e., regulates the speeds at which changes in ratio will be made to occur.

Turning now to Fig. 4, lever 130 is pivotally connected to a hollow bar 132 at 133 and to a lever 134 at 135. Said lever 134 is pivotally connected through a bell crank 136 to a power control lever 137 which may be the accelerator pedal of the vehicle. It will be apparent that lever 130 is a floating lever and that the position of bar 132 will be influenced by the joint action of governor 127 and pedal 137 so that at times movement of the bar 132 will be delayed or retarded by the pedal 137 if said pedal is depressed more than the usual amount. This means that when the operator of the vehicle wishes to accelerate the vehicle and hence desires to remain in a lower ratio longer, the mere depression of the accelerator pedal in the natural way will automatically override the governor and delay the movement of the bar 132 to the left as viewed in Fig. 4, and this in turn, as will be pointed out below, will delay shift of the devices controlled by the bar.

Telescoped in hollow bar 132 is a rod 138 the opposite end of which is telescoped in the hollow portion 139 of another bar 140. Said bar 140 is pivotally connected at 148 to a lever 141 one end of which is connected to yoke 75 which rides in groove 73 of shift collar 16, and the other end of which is pivotally connected to one end of a toggle 142 serving in this case as an overcenter device. The other part 143 of the toggle 142 is in the form of a bell crank anchored at 144 and connected at 145 to a manually operated lever 146 which is controlled from the operator's compartment. A spring 147 is tensioned between the ends of the toggle and maintains the toggle in one or the other of its limiting positions.

Motion is transmitted from bar 132 to bar 140 and vice versa through springs 149 and 150. The end 151 of spring 149 is anchored in a flange 152 and end 153 is anchored in a flange 154 on rod 138. Similarly spring 150 has one end 155 anchored in flange 154 and its other end 156 anchored in a flange 157 on hollow portion 139. Ordinarily bar 132, rod 138 and bar 140 move together as a unit, but if one bar encounters a resistance while the other is attempting to move it, springs 149 and 150 will compress or expand and will move flange 154 toward or away from flange 157 or flange 152.

Secured to flange 157 is a U-shaped rod 158 on the inside of which are electrical contacts 159 and 160 which are connected together by a wire 161 but are electrically insulated from rod 158. A contact 162 is mounted on flange 154 so as to be movable with said flange between contacts 159 and 160. Thus when rod 132 is moved toward rod 140 and the latter resists, springs 149 and 150 are compressed until contact 162 strikes contact 159, and when rod 140 moves toward rod 132 and the latter resists, the springs are extended until contact 162 strikes contact 160. Contact 162 is connected to a wire 163 which in turn is connected to a source of electrical energy 164 and ground 165. Wire 161 is connected to a relay 166 and ground 167, relay 166 having a switch 168 which connects wire 161 to electromagnet 115 and ground 169. It is apparent that when contact 162 strikes either contacts 159 or 160, relay 166 is energized, thus closing switch 168 and energizing electromagnet 115. This in turn causes brake 35 to operate and retard or stop altogether hollow shaft 13 and its associated sun gear 20.

An interlock is provided between second speed two-way brake 122 and bar 132 so that bar 132 will not be able to move past the automatic second speed position. This interlock is comprised of a latch 170 which is pivotally mounted on rockshaft 126 and rotatable with said rockshaft into and out of alignment with an abutment 171 movable with bar 132. Latch 170 is so oriented on rockshaft 126 that it will be in alignment with abutment 171 when brake 122 is operated. Should the transmission be in a higher ratio than second speed at the time brake 122 is to be operated then latch 170 will serve as a safety device to prevent a shift into two ratios simultaneously.

Having described the components of the transmission, the operation of the transmission as a whole will now be described.

Assuming first the condition wherein the drive shaft 10 is stationary as well as the driven shaft 11, which is the condition which obtains when the vehicle engine is dead and the vehicle itself is standing still, collar 16 will be in its neutral position and will be held there by toggle 142. Said toggle will be so positioned by movement of control lever 146 to the right as viewed in Fig. 4 which causes the toggle to assume the dotted position shown in that figure. The associated lever 141 will pivot about the end of bar 140 so that the collar 16 will be moved to the right (Fig. 1) until the left-hand end of slot 72 contacts pin 71. This positions cage 65 of clutch 15 so that the rollers 64 thereof are in the depressions 63 and hence are ineffectual to transmit a drive in either direction. The movement of control lever 146 may be coordinated with the movement of rockshaft 109 by any suitable means (not shown) so that the latter will hold sprags 107 and 111 out of contact with their respective toothed wheels 105 and 110 thereby preventing the establishment of the necessary reaction for a drive through the gears in either forward or reverse directions. The control for second speed lockup clutch 122 however is independent of the control for rod 146 so that if it is desired to hold the vehicle in gear, as is required by law in some states, this can be done by manually rotating rockshaft 126 counterclockwise as viewed in Figs. 1 and 4 until sprag 124 contacts wheel 123. The operation of brake 122 will cause sun gear 24 to be held and will condition the transmission for second speed operation whether the driven shaft or the drive shaft is the driver.

When it is desired to shift the transmission into forward low speed drive, control lever 146 is moved in the opposite direction to cause toggle 142 to assume the solid position shown in Fig. 4 and rotate lever 141 about pivot 148 until pin 71 is slid into straight portion 77 of slot 72. This rotates cage 65 until rollers 64 are wedged between cams 62 and cylindrical surface 66 and are thus rendered effective to transmit a drive from clutch 14 to hollow shaft 13. Simultaneously with the movement of control lever 146 to the forward drive position just described, rockshaft 109 is rotated counterclockwise until sprag 107 engages wheel 105 and thus causes brake 33 to be engaged. This establishes a one-way reaction for sun gear 24 and the gearing is conditioned for low speed operation.

The engine having been started prior to the shift to low so that it is now idling and drive shaft 10 is rotating slowly, the vehicle is started moving by depressing the accelerator pedal 137 to open the engine throttle (not shown) and thus speed up the engine. As the speed of drive shaft 10 increases above the engaging speed of clutch 14 the weights 49 will move radially outward thereby moving pressure plate 41 against clutch disc 47 and compressing the latter against flywheel 38. The driving torque is then transmitted through the clutch 14 to clutch 15 and the latter having been conditioned to transmit the drive by the shift of collar 16 will turn hollow shaft 13 and its associated sun gear 20. With sun gear 24 as the reactance member, the drive will be transmitted to spider 32 and finally to driven shaft 11. Said driven shaft being connected to the drive wheels of the vehicle, the latter will begin to move and will accelerate. The increased speed of the driven shaft will cause the balls of the governor 127 to move outward, thereby shifting rod 130 to the left. This will cause bar 132 to move to the left likewise, the movement being transmitted through the springs 149 and 150 and bar 140 to lever 141. This in turn will urge shift collar 16 to its second speed position wherein positive clutch 17 is engaged.

The leftward movement of bar 132 may be arrested by the depression of accelerator pedal 137 to an unusual degree as may occur when it is desired to reach a high engine speed quickly and it is advantageous to remain in low speed ratio at a higher vehicle speed. This operation of the pedal is instinctive and requires no conscious effort on the part of the operator. Even with a wide-open throttle, however, a speed will eventually be reached at which clutch 17 will tend to engage, but actual engagement will not occur unless either one of two conditions are set up. Under both conditions it is necessary to reverse the relative direction of torque between the two elements of clutch 17. Due to the arrangement of the gears, when the transmission is operating in low ratio intermediate shaft 12 is rotating slower than drive shaft 10 and blocker 91 is blocking shift of clutch 17. To unblock clutch 17 under the first condition the engine is decelerated by releasing the accelerator pedal 137, thus slowing down sun gear 20. The vehicle, however, continues to move at substantially the same speed and eventually a speed is reached at which drive shaft 10 begins to rotate more slowly than intermediate shaft 12 at which time blocker 91 will roll out of the way and clutch 17 will be engaged.

Under the second condition, clutch 17 is unblocked without any manipulation of the accelerator pedal, that is to say, the shift of clutch 17 is effected in the same manner as a power shift despite the fact that clutch 17 is a blocked positive clutch and hence must be synchronized and then reversed. To effect such shift with manipulation of the accelerator pedal, the operator merely continues to accelerate for a given accelerator pedal position until the vehicle is moving at the speed at which no further advantage can be gained in remaining in the low ratio. At this point governor 127 will have moved lever 130 and its associated bar 132 to the left as viewed in Fig. 4 and since movement of bar 139 is arrested by the refusal of clutch 17 to engage due to the blocked condition of teeth 95, springs 149 and 150 will be compressed, thereby moving rod 138 to the left until contact 162 touches contact 159.

At this point a circuit will be established from battery 164, conductor 163, contacts 162 and 159 and relay 166, thereby energizing said relay and closing contacts 168. This in turn energizes the electromagnet 115 of friction brake 35. At this point the power will be transmitted from drive shaft 10 through clutches 14 and 15 to hollow shaft 13 to which brake disc 116 is keyed. Said brake 35 therefore when energized will tend to arrest the rotation of drive shaft 10, and as the speed of said shaft 10 decreases, precisely the same effect is achieved as though the driver released accelerator pedal 137 to slow down the engine. Thus a point will be reached wherein the driving element 59 of clutch 17 will tend to rotate more slowly than intermediate shaft 12, thereby unblocking blocker ring 91 and permitting teeth 90 of clutch 17 to pass through teeth 95 of the blocker into engagement with driving teeth 60. Just as soon as engagement of clutch 17 is effected, the resistance to movement of shift collar 16 is removed and the collar and its associated lever 141 and bar 139 will move to the left as viewed in Fig. 4, thereby relieving the spring pressure in springs 149 and 150 and allowing contacts 159 and 162 to separate. This will deenergize relay 166 and in turn, through the opening of contacts 168, will deenergize electromagnet 115. This instantly releases brake 35 and permits brake disc 116 to rotate freely. As previously described, engagement of clutch 17 automatically effects the disengagement of overrunning clutch 15 and hence establishes a second speed drive.

Since the shift of shift collar 16 for each speed ratio is progressive in the same direction, the shift from second speed to direct drive may be effected in the same manner as the shift from first to second. Thus, in shifting from second speed to direct drive, it is necessary to shift roller cage 65 in the direction to prevent clutch 15 from overrunning. Although clutch 15 is, in a sense, a friction clutch, it is undesirable to engage the clutch until the driving and driven elements thereof are synchronized. Hence, to shift from second speed to direct drive after governor 127 has positioned shift collar 16 to effect the necessary change in the position of cage 65, the operator may either release the accelerator pedal, thus permitting the intermediate shaft 12 to slow down and with it slow down hollow shaft 13 until the two are rotating at the same speed as drive shaft 10, whereupon blocker 79 is moved out of the way and teeth 87 of shift ring 16 are permitted to pass through the teeth of the blocker, or the operator may continue to depress accelerator pedal 137 and then the resistance of shift collar 16 to movement to the left combined with the force developed in governor 127 will again close contacts 159 and 162 to energize relay 166 and electromagnet 115. The latter mode of operation will result in the slowing down of hollow shaft 13 until its speed is slightly less than that of drive shaft 10 whereupon the unblocking takes place as aforesaid.

The shift from direct drive to overdrive is effected by the operation of governor 127, closing contacts 159 and 162 against the resistance of shift collar 16. It will be observed that after collar 16 has been shifted to the direct drive position, pin 99 will be at the left-hand end (Fig. 1) of slot 100 so that above third speed or direct drive, further movement of governor 127 must necessarily compress springs 149 and 150, thereby moving contact 162 toward contact 159; and at some predetermined speed contact 162 will touch contact 159 and again effect the energization of relay 166 and electromagnet 115. In direct drive, overrunning clutch 15 is conditioned to permit drive shaft 10 to rotate ahead of hollow shaft 13 and hence, when brake 35 is energized, the shift from direct drive to overdrive will be effected smoothly by the simple release of overrunning clutch 15 when brake 35 is sufficiently energized to provide the necessary reaction for overdrive operation.

Upon coasting down from overdrive to direct drive speed, the shift will be effected automatically in the transmission by the disconnection of contacts 159 and 162 in response to the movement of governor 127 from its overdrive position to its direct drive position. There is no torque load on interengaging elements which must be released at this time and hence the downshift from overdrive to direct drive is effected without any difficulty.

The downshift from overdrive to direct drive may also be effected while governor 127 is in its overdrive position. This is accomplished by simply tramping down on accelerator pedal 137 to the limit of its travel, thereby causing bell crank 136 to rotate in a counterclockwise position, moving the link 134 and lever 130 to the right as viewed in Fig. 4. This in turn moves bar 132 to the right and releases the pressure on springs 149 and 150. This in turn will effect a separation of contacts 159 and 162 to deenergize relay 166 and electromagnet 115. Thus, the governor may be overruled should conditions make it necessary to increase the acceleration of the vehicle.

In the downshift from direct drive to second speed the operator may again release accelerator pedal 137 so as to permit the speed of the engine and the torque on drive shaft 10 to decrease. With the driving torque removed from clutches 17 and 15, the shift of shift collar 16 to the second speed position is effected without difficulty. However, should the vehicle be in direct drive and ascending a steep incline so that the speed of the vehicle gradually decreases to a point where a shift to second speed would be desirable, the torque load on clutches 17 and 15 is too great to permit collar 16 to be shifted by the force of the governor 127 and springs 149 and 150. The release in driving torque is effected, however, by the energization of electromagnet 115 to energize brake 35, thereby slowing down brake disc 116 and its associated hollow shaft 13 until a relative reversal of direction of rotation is effected between drive shaft 10 and hollow shaft 13. The energization of electromagnet 115 under these conditions is effected by the action of governor 127 on bar 132 and springs 149 and 150. Since shift collar 16 cannot move to the right under torque load between the driving and driven elements of clutch 15, it becomes an anchor so that the relaxation of governor 127 in response to the slowing down of the vehicle, causes springs 149 and 150 to be extended. This extension eventually results in contact 162 touching contact 160 whereupon a circuit is established from battery 164 through contacts 162 and 160 to relay 166. Said relay when energized closes contacts 168 and energizes electromagnet 115 as aforesaid. The completion of the downshift will automatically disconnect contacts 162 and 160 to release brake 35.

Thus a downshift may be effected without the manipulation of the accelerator or pedal, thereby simulating a power shift. If, however, the governor is in its third speed or direct drive position and increased acceleration is desired, the downshift may still be effected by the operator merely by depressing the accelerator pedal 137 to substantially the limit of its movement in that direction. This will cause bar 132 to be moved to the right as viewed in Fig. 4 in response to a similar movement of link 134 and lever 130, and since shift collar 16 is anchored by the torque load as described above, the same extension of springs 149 and 150 takes place which again results in the establishment of a circuit through contacts 160 and 162 to energize relay 166 and electro-magnet 115. This in turn causes brake disc 116 to slow down and tend to stop, which in turn in its slowing down operation effects the release of clutch 15.

Since clutch 17 operates to all intents and purposes like clutch 15 insofar as release and engagement under torque are concerned, it will be apparent that shift from second to first speed may be effected in exactly the same manner as a shift from direct drive to second speed, and hence further description thereof can be dispensed with.

It is apparent from the foregoing description that the four-speed transmission illustrated in Figs. 1 to 4, inclusive, provides a simple means for effecting shifts automatically without any action on the part of the operator, or semi-automatically with some assistance from the operator at the operator's option. Means are provided whereby a synchronization of two clutch parts is brought about by an exterior device which is operable for effecting two shifts of synchronizable devices and then is operable to effect a third shift in which it becomes the shifting device itself. In other words, a shift device for one ratio in a multi-ratio transmission is utilized to assist in effecting other shifts in the transmission so that considerable efficiency is achieved. Since its function is purely that of a synchronizing device, it is not necessary to make it sufficiently strong to withstand the full torque of the engine, but only that torque which results from its operation as a ratio-establishing mechanism.

It is also apparent that whereas in the average power-shifted transmission, the synchronizing and ratio-establishing functions are usually incorporated in the same device, in the foregoing description means have been disclosed which separate the synchronizing device from the ratio-establishing device.

It is understood that the foregoing description is merely illustrative of a preferred embodiment schematically disclosed and that the scope of the invention is not to be limited thereto but is to be determined by the appended claims.

What is claimed is:

1. A variable speed power transmitting device comprising input and output structures, constant mesh variable speed gearing adapted to provide a plurality of speed ratios between said input and output structures, a plurality of input members connected to the gearing, an output member for the gearing connected to the output structure, a plurality of clutch means for connecting the input members to the input structure, one of said clutch means being operable upon substantial synchronization of the driving and driven parts thereof, a plurality of reaction means associated with the gearing and cooperating with said clutch means to effect the said changes in speed ratio through the gearing, control means for the clutch and reaction means and operating the said one clutch means and at least one of the reaction means in sequence such that the reaction means is operated momentarily just prior to the operation of said one of the clutch means to cause the driving and driven parts of the said one clutch means to reach the synchronization required for operation of the said one clutch means through the associated constant mesh gearing and thereby effect changes in speed ratio while torque is being transmitted to the input shaft.

2. A variable speed power transmitting device for transmitting power from an engine to a load, said device comprising an input structure connected to the engine, an output structure connected to the load, variable speed constant mesh gearing including reaction means connected to the gearing, said reaction means being operable while subjected to torque to condition the gearing for highest speed operation, means connecting the gearing to the output structure, a plurality of input members connected to the gearing, clutch means for connecting the input members to the input structure, means for preventing operation of one of said clutch means except upon reversal of torque through said one clutch means, control means for the said one clutch means to condition the said one clutch means for operation, and means for operating the reaction means momentarily while the input structure is receiving power from the engine and said clutch control means is conditioning the said one clutch means for operation, the operation of the reaction means effecting a torque reversal in the clutch means through the gearing and one of the input members, thereby permitting the said clutch means to operate.

3. A variable speed power transmitting device for transmitting power from an engine to a load, said device comprising an input structure connected to the engine, an output structure connected to the load, variable speed constant mesh gearing including reaction means connected to the gearing, said reaction means being operable while subjected to torque to condition the gearing for highest speed operation, means connecting the gearing to the output structure, a plurality of input members connected to the gearing, clutch means for connecting the input members to the input structure, means for preventing operation of one of said clutch means except upon reversal of torque through said one clutch means, control means for the said one clutch means to condition the said one clutch means for operation, speed responsive means driven in timed relation with the output structure for operating the clutch control means, and means for operating the reaction means momentarily while the input structure is receiving power from the engine and said clutch control means is conditioning the said one clutch means for operation, the operation of the reaction means effecting a torque reversal in the clutch means through the gearing and one of the input members, thereby permitting the said clutch means to operate.

4. A variable speed power transmitting device for transmitting power from an engine to a load comprising an input structure connected to the engine, an output structure connected to the load, variable speed constant mesh gearing adapted to provide a plurality of speed ratios through the device, a pair of input members connected to the gearing, a toothed clutch for connecting one of said input members to the input structure, a coupling device connected to the input structure and operable automatically in response to a predetermined speed of rotation of the input structure to effect a drive through said coupling device, one-way clutch means for connecting the first-mentioned coupling device to the other input member, means for rendering said one-way clutch means inoperative, or for reversing the direction of drive through said one-way clutch means, an output member for the gearing connected to the output structure, control means for the toothed clutch and the means for reversing the direction of drive through the one-way clutch means, and means responsive to the speed of the output structure to operate the control means.

5. A variable speed power transmitting device as described in claim 4, a friction brake for the said other input member operable in conjunction with the gearing to render effective one of the speed ratios through the gearing, and means for operating the brake momentarily prior to rendering effective another of the speed ratios to effect substantial synchronization of the toothed clutch through the gearing prior to the operation of the toothed clutch.

6. A variable speed power transmitting device as described in claim 4, a friction brake for the said other input member operable in conjunction with the gearing to render effective one of the speed ratios through the gearing, means for rendering the operation of the one-way clutch means dependent upon substantial synchronization of the structure and member to be coupled thereby, and means for operating the brake momentarily to effect said substantial synchronization.

7. A variable speed power transmitting device for transmitting power from an engine to a load comprising an input structure connected to the engine, an output structure connected to the load, constant mesh gearing adapted to provide a plurality of speed ratios through the gearing, a pair of input members connected to the gearing, each when operative adapted to produce a different ratio, a coupling device connected to the input structure and operable automatically in response to a predetermined speed of rotation of the input structure to provide a drive through said coupling device, a one-way coupling device for connecting the first-mentioned coupling device to one of the members, said one-way coupling device being controllable to break the drive therethrough or to provide a one-way drive in either direction, a jaw clutch for connecting the second input member to the input structure, reaction means for holding the first-mentioned input member against rotation to produce in combination with the gearing one of said ratios, and means for operating the reaction means momentarily prior to the operation of the one-way device and the jaw clutch to effect substantial synchronization of the one-way device and of the parts to be connected by the jaw clutch.

8. A variable speed power transmitting device comprising first and second planetary gear sets each comprising a sun gear, a ring gear, planet pinions meshing with the sun and ring gears and a carrier for the pinions, means connecting the carrier of the first set with the ring gear of the second set, means connecting the ring gear of the first set with the carrier of the second set, means for releasably holding the sun gear of the second set against rotation to provide a reaction for torque multiplication, input and output structures for the device, means for transmitting the drive from the ring gear of the first set and the carrier of the second set to the driven structure, a jaw clutch for connecting the carrier of the first set to the driving structure, a coupling device connected to the driving structure and operable in response to increase in speed of the driving structure above a predetermined range of speeds and a controllable one-way clutch connecting the coupling device to the sun gear of the first set, said one-way clutch being adapted to transmit a drive selectively in either direction or to prevent the transmission of drive therethrough.

9. A variable speed power transmitting device as described in claim 8, means associated with the jaw clutch for preventing operation thereof except upon a relative reversal of drive between the parts thereof, and means associated with the controllable one-way clutch for preventing operation thereof in one direction of drive except upon a relative reversal of direction of rotation between the parts thereof.

10. A variable speed power transmitting device as described in claim 8, means associated with the jaw clutch for preventing operation thereof except upon a relative reversal of drive between the parts thereof, means associated with the controllable one-way clutch for preventing operation thereof in one direction of drive except upon a relative reversal of direction of rotation between the parts thereof, brake means operable under torque to arrest the rotation of the sun gear of the first set, and means for controlling the operation of the brake means to operate said brake means momentarily prior to connection or disconnection of either the jaw clutch or the one-way clutch to effect, by means of the gearing connected between the brake and jaw clutch and the one-way device a reversal of drive through the jaw clutch and to effect a reversal of direction of rotation through the one-way device.

11. In a power transmitting device comprising an input structure, a source of power connected to the input structure, an output structure connected to a load, constant mesh speed and torque changing gearing connected in part to the output structure, said gearing having a plurality of input members, clutch means for connecting one of the input members of the gearing to the input structure, means for connecting another of the input members to the input structure and means for preventing operation of the clutch means except upon substantial synchronization of the elements thereof; control means for the clutch means comprising means for conditioning the clutch means for operation in response to the attainment of a predetermined speed of rotation of the output structure, a power control element for the source of power, means operated by the power control element for delaying the operation of the clutch control means, a brake connected to the gearing, power means for operating the brake, and means for controlling the brake power means, said brake power control means being operated jointly by the power control element and the speed responsive means and operated after the clutch means has been conditioned for operation and upon the output structure attaining a predetermined speed higher than the first-mentioned speed, said brake when operative acting through the gearing and the means connecting the other input member to the input structure to slow down the input structure, thereby effecting substantial synchronization of the clutch means to permit said clutch means to operate.

12. In a power transmitting device comprising an input structure, a source of power connected to the input structure, an output structure connected to a load, constant mesh speed and torque changing gearing connected in part to the output structure, said gearing having a plurality of input members, clutch means for connecting one of the input members of the gearing to the input structure, means for connecting another of the input members to the input structure and means for preventing operation of the clutch means except upon substantial synchronization of the elements thereof; control means for the clutch means comprising means for conditioning the clutch means for operation in response to the attainment of a predetermined speed of rotation of the output structure, a power control element for the source of power, means operated by the power control element for delaying the operation of the clutch control means, a brake connected to an element of the gearing, electromagnetically controlled means for operating the brake, and a switch for controlling the electromagnetic means, said switch being operated jointly by the power control element and the speed responsive means and closed after the clutch means has been conditioned for operation and upon the output structure attaining a predetermined speed higher than the first-mentioned speed, said brake when operative acting through the gearing and the means connecting the other input member to the input structure to slow down the input structure, thereby effecting substantial synchronization of the clutch means to permit said clutch means to operate.

13. In a power transmitting device comprising an input structure, a source of power connected to the input structure, an output structure connected to a load, constant mesh speed and torque changing gearing connected in part to the output structure, said gearing having a plurality of input members, clutch means for connecting one of the input members of the gearing to the input structure, means for connecting another of the input members to the input structure, said clutch means being releasable only upon relief of torque between the elements thereof, control means for the clutch means comprising means for conditioning the clutch means for disengagement in response to a drop in speed of rotation of the output structure to a predetermined value, a power control element for the source of power, a brake connected to a part of the gearing, power means for operating the brake, and means for controlling the brake power means, said controlling means being operated in response to the speed responsive means reaching a speed below said predetermined value, said brake when operative acting through the gearing and the means connecting the other input member to the input structure to slow down the input structure, thereby effecting a momentary relief of torque through the clutch means to permit the clutch means to release.

14. In a power transmitting device comprising an input structure, a source of power connected to the input structure, an output structure connected to a load, constant mesh speed and torque changing gearing connected in part to the output structure, said gearing having a plurality of input members, clutch means for connecting one of the input members of the gearing to the input structure, means for connecting another of the input members to the input structure, said clutch means being releasable only upon relief of torque between the elements thereof, control means for the clutch means comprising means for conditioning the clutch means for disengagement in response to a drop in speed of rotation of the output structure to a predetermined value, a power control element for the source of power, a brake connected to a part of the gearing, electromagnetic means for operating the brake, and a switch for controlling the electromagnetic means, means for operating said switch by the clutch control means when said clutch control means reaches a speed below said predetermined value, said brake when operative acting through the gearing and through the means for connecting another of the input members to the input structure to slow down the input structure, thereby effecting a momentary relief of torque through the clutch means to permit the clutch means to release.

15. In a power transmitting device as described in claim 12, a second switch adapted to energize the electromagnetically controlled means, and means for actuating said second switch while the clutch means is operated and upon the speed responsive means slowing down to a speed below that at which the clutch means is conditioned for operation.

16. In a power transmitting device comprising input and output structures, a source of power connected to the input structure, an output structure connected to a load, constant mesh speed and torque changing gearing connected in part to the output structure, clutch means for connecting the gearing to the input structure, and a brake for a part of the gearing, control means for the clutch and brake comprising a lever for engaging and disengaging the clutch, speed responsive means for operating the lever, said speed responsive means including a pair of bars, resilient means extensible and compressible between the bars to transmit the motion of the speed responsive means to the lever, and means energized as a function of the extension or compression of the resilient means to energize the brake, whereby to control the engagement and disengagement of the clutch means and brake by said speed-responsive means.

17. In a power transmitting device as described in claim 16, said clutch means being releasable only upon relief of drive therethrough, and means for preventing engagement of said clutch means except upon substantial synchronization of the elements thereof, said brake means being operable while power is being transmitted to the input structure.

18. In a device for transmitting power from an engine to a load, an input structure connected to the engine, an output structure connected to the load, speed and torque changing gearing comprising first and second planetary gear sets, each set comprising a sun gear, a ring gear, planet gears meshing with the sun and ring gears and a carrier for the planet gears; a pair of input elements, one connected to the sun gear of the first set and the other connected to the carrier of the first set, means connecting the carrier of the first set with the ring gear of the second set, means connecting the ring gear of the first set and the carrier of the second set with the output structure, automatically releasable brake means for holding the sun gear of the second set against rotation in a direction opposite to that of the input structure, a speed responsive coupling device and a controllable one-way clutch connected in series between the input structure and the first-mentioned input element, said controllable one-way clutch being adapted selectively to effect a drive in either direction or to break the drive to the said sun gear connected thereto, a jaw clutch for transmitting drive between the input structure and the second-mentioned input element, friction brake means for holding the first-mentioned input element against rotation, a common control for the one-way and jaw clutches, said control being movable in one direction successively to break the drive through both the one-way and jaw clutches, then to condition the one-way clutch for drive in the same direction as the input structure, then to engage the jaw clutch and then to condition the one-way clutch for drive in the opposite direction, whereby to effect changes in speed from neutral to first, second and third speeds; and speed responsive control means driven from the output structure for moving the common control to its said positions and for controlling the friction brake to effect a fourth speed.

CHARLES F. VOYTECH.

REFERENCES CITED

The following references are of record in the file of this patent:

UNITED STATES PATENTS

| Number | Name | Date |
|---|---|---|
| 1,609,782 | Small | Dec. 7, 1926 |
| 2,103,540 | Livermore | Dec. 28, 1937 |
| 2,171,534 | Banker | Sept. 5, 1939 |
| 2,259,732 | Burtnett | Oct. 21, 1941 |
| 2,303,975 | Banker | Dec. 1, 1942 |
| 2,329,724 | Maurer | Sept. 21, 1943 |
| 2,395,459 | Carnagua | Feb. 26, 1946 |

FOREIGN PATENTS

| Number | Country | Date |
|---|---|---|
| 389,207 | Germany | June 28, 1924 |
| 425,870 | Great Britain | Mar. 22, 1935 |
| 568,292 | France | Dec. 19, 1923 |